United States Patent
John

[15] 3,704,959
[45] Dec. 5, 1972

[54] GUARDS
[72] Inventor: Ronald John, London, England
[73] Assignee: Molins Machine Company Limited, London, England
[22] Filed: Oct. 13, 1970
[21] Appl. No.: 80,337

[52] U.S. Cl. ............408/241 G, 51/271, 144/251 R, 408/710
[51] Int. Cl. .....................B23b 47/00, B23q 11/08
[58] Field of Search .408/241, 241 G, 710; 145/31 B; 144/251 R, 251 A, 251 B; 51/268, 271; 267/166, 167; 277/198, 203

[56] References Cited
UNITED STATES PATENTS

| | | |
|---|---|---|
| 1,721,740 | 7/1929 | Klausmeyer..............408/710 |
| 1,659,978 | 2/1928 | Klausmeyer..............408/710 |

*Primary Examiner*—Francis S. Husar
*Attorney*—Emory L. Groff and Emory L. Groff, Jr.

[57] ABSTRACT

A retractable guard, more particularly for an axially movable cutting tool spindle of a machine tool to prevent ingress of swarf, and consisting of a stainless steel strip wound as a helical spiral with adjacent turns partially overlapping so that the axial movement varies the amount of overlap and the conicity of the guard.

5 Claims, 7 Drawing Figures

PATENTED DEC 5 1972

INVENTOR
RONALD JOHN
By Emery L. Groff
ATTY

INVENTOR
RONALD JOHN

GUARDS

The present invention relates to guards and more particularly to guards for fitting between a movable and a fixed part of a machine so that as the movable part moves the guard expands or contracts.

According to the present invention there is provided a guard comprising a flat strip wound in helical form with adjacent turns overlapping to form a cone and slidable one within the other to vary the degree of overlap and the conicity of the cone, the strip having stops which coact with one another to limit the amount of adjustment of the guard.

The stops may be narrower strips secured to the guard strip, or they may be made integral with the strip by the edges thereof being folded back on to the strip.

One end of the strip may be anchored to the housing of an axially-movable cutting tool spindle of a machine tool, the other end being anchored to stationary structure, so that movement of the spindle varies the conicity of the guard. The radially outer end of the strip may be pivotally anchored inside a resilient split ring which is sprung into an aperture in the housing to grip therein by its resilience. To adjust the tightness of the helix the split ring is contracted and rotated and then released.

How the invention may be carried out will now be described, by way of example only, with reference to the accompanying drawings in which.

Figure 1:
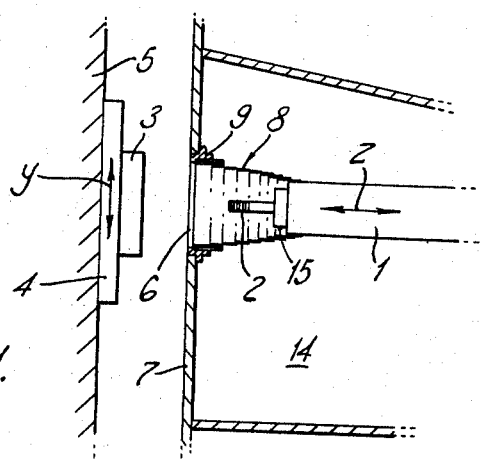
FIG. 1 is a fragmentary schematic representation of a machine tool fitted with a guard constructed according to the present invention.

A machine tool has a spindle housing 1 which is slidable in two mutually perpendicular directions $x$ and $z$, the $z$ direction being in the plane of the drawing and the $x$ direction perpendicular to the plane of the drawing, movement in the $z$ direction being to bring a tool 2 carried by the spindle into or out of contact with a workpiece 3 carried by a pallet 4 which is mounted on a back plate 5, the latter being movable in a $y$ direction indicated, the $x$, $y$ and $z$ being mutually perpendicular.

The spindle is movable through an aperture 6 formed in a stationary plate 7 of the machine tool.

A guard generally indicated by the reference numeral 8 and constructed according to the present invention is connected between the stationary plate 7 and the spindle housing 1.

Figure 2:
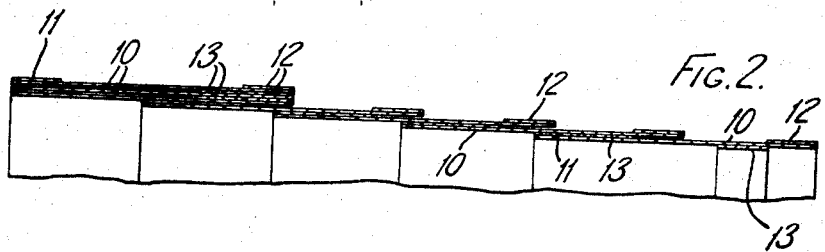
FIG. 2 is a fragmentary view on an enlarged scale of a portion of the guard shown in FIG. 1.

The guard 8, shown in more detail in FIG. 2, comprises a stainless steel strip, in this case 0.006 of an inch thick which is wound in the form of a spiral, the outer end of which is secured to the fixed plate 7 by means of a split ring 9, and the inner end of which is secured to the spindle housing 1.

The strip 10 has two much narrower strips 11 and 12 welded to its outer surface and a single similar narrower strip 13 welded to its inner surface. The strips 11, 12 and 13 act as stops to limit the extent to which the strip can be extended in the form of a cone. Without these narrow strips 11, 12 and 13 the strip 10 could be extended to such a point that the individual turns of the spiral would fall apart. In the embodiment shown the strips 11, 12 and 13 are selected to be of such a width that each turn or coil of the spiral can only extend to a maximum of half the total width of the strip 10.

As the spindle housing 1 moves in the $z$ direction towards and away from the workpiece 3 the strip 10 will contract and expand to follow this movement but all the time the adjacent coils or turns of the strip 10 will be in contact with one another and thus prevent swarf or other foreign matter from passing from the area in which machining is taking place into the area generally indicated by the reference numeral 14 where the swarf or other foreign matter could cause damage to the machine tool.

Cutting oil will be directed towards the cutting portion of the tool 2 and this oil which will be scattered and broken up by the tool and pieces of swarf will also lubricate sufficiently the inner surface of the guard 8.

However, if it is desired that additional lubrication be provided, a nozzle 15 is directed towards the guard 8 so that lubricant from the machine tool's lubrication system is injected onto the guard 8 in order to make the adjacent coils of the strip 10 slide freely with respect to one another as the spindle housing 1 moves towards and away form the workpiece 3.

Figure 3:
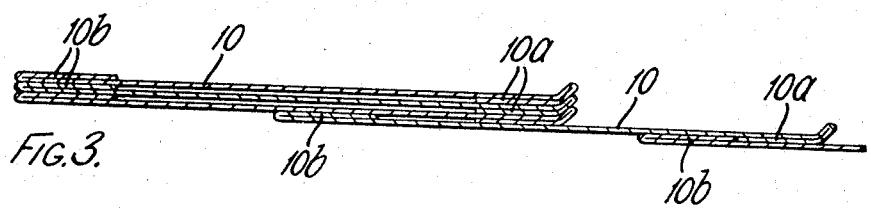
FIG. 3 is a view similar to FIG. 2 showing a second embodiment of the invention.
Figure 4:
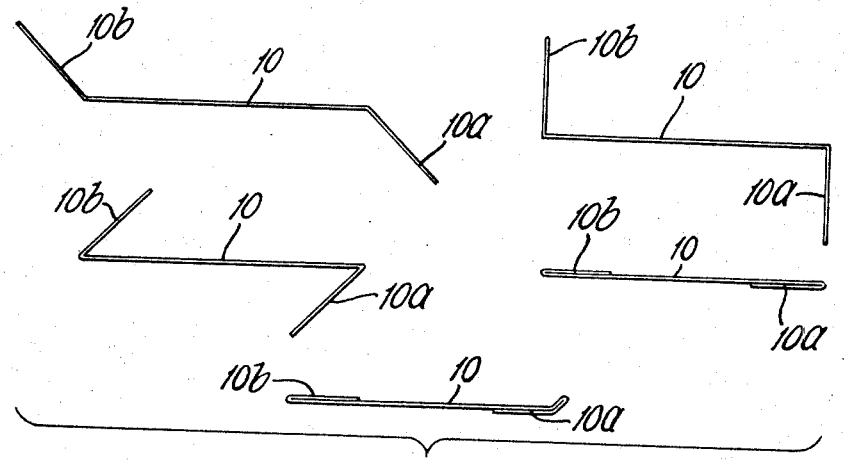
FIG. 4 is a diagrammatic representation of the stages of manufacture of the embodiment shown in FIG. 3.

An alternative construction of guard is shown in FIG. 3 and the method of forming it in FIG. 4.

This alternative guard is basically the same as the guard already described with reference to FIGS. 1 and 2 in that it comprises a strip 10 but in this case the stops instead of being formed by separate strips 11 to 13 are in fact formed integral with the strip 10 by folding or rolling the edges 10a and 10b of the strip 10 back along themselves, the trailing edge 10a then being bent radially outwardly.

The method of forming the guard shown in FIG. 3 is shown diagrammatically in FIG. 4.

Referring to FIG. 4, the strip 10 is first rolled along its edges to form the bent portions 10a, 10b. These portions are then further rolled to bring them at right angles to the main body of the strip 10. In the third stage of rolling they are further bent at an acute angle to the main body 10 of the strip and finally rolled flat so they double back on themselves and are in contact with the main body 10 of the strip. The portion 10a is then bent radially outwardly as shown in the last stage of FIG. 4.

As mentioned earlier the radially outer end of the strip 10 is mounted in a split ring 9 secured to the fixed plate 7. The split ring itself is provided with a clip around its outer periphery by means of which the split ring 9 can be contracted or loosened in order to tighten or loosen its grip on the strip 10 and thus reduce or increase the diameter of the outermost coil or turn of the strip 10.

Figure 5:
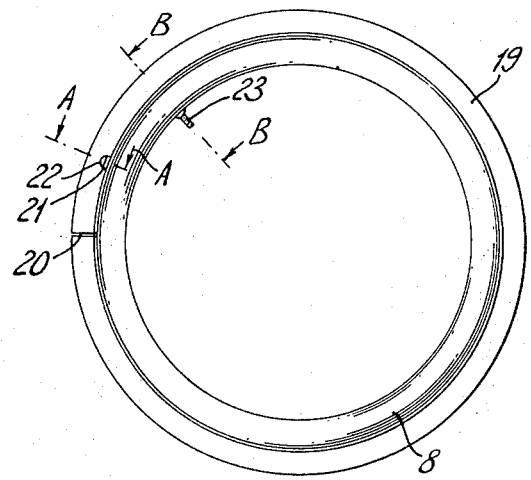
FIG. 5 is an end view of the guard and its mounting ring.
Figure 6:
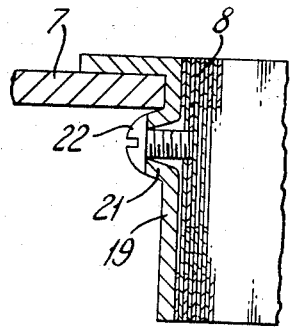
FIGS. 6 and 7 are sections on the lines A—A and B—B respectively of FIG. 5.
Figure 7:
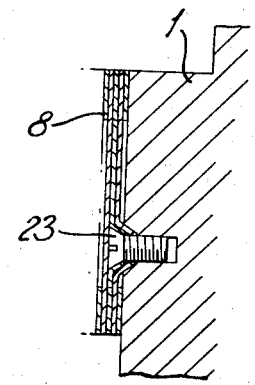

The split ring may also be as shown in FIGS. 5, 6 and 7. The ring 19 is resilient and has a radial split at 20. A screw 22 passes through a boss 21 and is screwed into the outer turn of the guard ring 8. The ring 19 is sprung by its own resilience into engagement with the edge of the aperture 6 in the plate 7. At the radially inner end of the guard 8 a screw 23 passes through a hole in the inner turn of the guard ring 8 and is screwed into the spindle housing 1. The radially outer and radially inner ends of the guard ring 8 can pivot about the axes of the screws 22 and 23 respectively as the spindle housing 1 moves along its axis to vary the conicity of the guard.

To adjust the tightness of the helix, the split ring 19 is contracted and turned within the aperture 6 and is then released.

Although only two constructions of stop have been illustrated the invention extends to any form of stop which limits the extent to which the strip 10 can be extended. Also, although both embodiments described employ a stainless steel strip 10 the invention extends to the use of any other suitable resilient material. Furthermore, although the invention has been described in connection with its application to a machine tool and more particularly to the tool carrying spindle of a machine tool, the invention could be used in any environment in which it is desired to have a guard between a movable and a fixed part or even between two movable parts of a machine or piece of apparatus.

What I claim as my invention and desire to secure by Letters Patent is:

1. A guard comprising a single elongated strip of material wound in a helical spiral with adjacent turns overlapping to form a cone and slidable one within the other to vary the degree of overlap and conicity of the cone, a first continuous stop disposed on the outer surface of the strip along the trailing edge thereof in the direction of contraction of the guard, and a second continuous stop disposed on the inner surface of the strip along the leading edge thereof, said first and second continuous stops being formed integrally with the strip by folding the long margins of the strip back on to said inner and outer surfaces respectively to form double thicknesses of material, said stops coacting with one another to limit extension of the guard.

2. A guard as claimed in claim 1 wherein said trailing edge and part of said first stop are bent radially outwards to form a continuous lip of double thickness of material, the lip on one turn coacting with the lip on an adjacent turn to limit contraction of the guard.

3. A guard as claimed in claim 1 wherein one end of the strip is anchored to the housing of an axially-movable cutting tool spindle of a machine tool, and the other end is anchored to stationary structure so that the conicity of the guard is varied as the spindle moves.

4. A guard as claimed in claim 3 wherein the radially outer end of the strip is pivotally anchored inside a resilient split ring which grips within an aperture in the stationary structure by its resilience.

5. A guard as claimed in claim 3 wherein the radially inner end of the strip is pivotally anchored to the spindle housing.

* * * * *